US006601816B1

(12) United States Patent
Hunte, II et al.

(10) Patent No.: US 6,601,816 B1
(45) Date of Patent: Aug. 5, 2003

(54) ART DISPLAY BRACKET

(76) Inventors: Ivan G. Hunte, II, 643 Eastern Ave, Ilford, Essex IG2 6PW (GB); Henric A. Thompson, 643 Eastern Ave, Ilford, Essex IG2 6PW (GB)

(*) Notice: Subject to any disclaimer, the term of this patent is extended or adjusted under 35 U.S.C. 154(b) by 0 days.

(21) Appl. No.: 10/215,590

(22) Filed: Aug. 9, 2002

(51) Int. Cl.[7] .................................................. B60R 1/02

(52) U.S. Cl. .................... 248/480; 248/475.1; 248/489; 248/466; 40/716; 40/757

(58) Field of Search .............................. 248/475.1, 489, 248/466, 316.1, 480, 230.6, 316.4; 40/716, 757, 745

(56) References Cited

U.S. PATENT DOCUMENTS

| | | | | | |
|---|---|---|---|---|---|
| 1,156,603 | A | * | 10/1915 | Kiefer | 248/316.1 |
| 1,189,098 | A | * | 6/1916 | Hall | 248/231.71 |
| 1,631,355 | A | * | 6/1927 | Baldwin | 248/316.6 |
| 2,052,877 | A | * | 9/1936 | Harrison | 40/563 |
| 2,981,506 | A | | 4/1961 | Saslow | |
| 3,285,549 | A | | 11/1966 | Cook | |
| 3,360,228 | A | | 12/1967 | Murdoch | |
| D266,223 | S | | 9/1982 | Swartz | |
| 4,610,418 | A | | 9/1986 | Graham | |
| 4,641,807 | A | | 2/1987 | Phillips | |
| 5,918,843 | A | * | 7/1999 | Stammers | 248/230.6 |
| 6,209,826 | B1 | * | 4/2001 | Pratt, Jr. | 248/48.2 |

* cited by examiner

*Primary Examiner*—Kimberly Wood

(57) ABSTRACT

A art display bracket for mounting works of art in a spaced apart relationship from a wall. The art display bracket includes an elongate mounting bracket that has opposite first and second ends and a longitudinal axis extending between the first and second ends. The second end of the mounting bracket has a stop portion extending upwardly from it. The mounting bracket has a flange upwardly extending from it that is positioned towards the second end of the mounting bracket. The flange has a threaded aperture extending through it. A threaded fastener is threadably inserted in the threaded aperture of the flange of the mounting bracket and is generally aligned with the longitudinal axis of the mounting bracket.

12 Claims, 4 Drawing Sheets

ART DISPLAY BRACKET

BACKGROUND OF THE INVENTION

1. Field of the Invention

The present invention relates to mounting brackets and more particularly pertains to a new art display bracket for mounting works of art, photographs, mirrors and other objects in a spaced apart relationship from a wall.

2. Description of the Prior Art

The use of mounting brackets is known in the prior art. More specifically, mounting brackets heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 4,610,418; U.S. Pat. No. 4,641,807; U.S. Pat. No. 2,981,506; U.S. Pat. No. Des. 266,223; U.S. Pat. No. 3,360,228; and U.S. Pat. No. 3,285,549.

While these devices fulfill their respective, particular objectives and requirements, the aforementioned patents do not disclose a new art display bracket. The inventive device includes an elongate mounting bracket that has opposite first and second ends and a longitudinal axis extending between the first and second ends. The second end of the mounting bracket has a stop portion extending upwardly from it. The mounting bracket has a flange upwardly extending from it that is positioned towards the second end of the mounting bracket. The flange has a threaded aperture extending through it. A threaded fastener is threadably inserted in the threaded aperture of the flange of the mounting bracket and is generally aligned with the longitudinal axis of the mounting bracket.

In these respects, the art display bracket according to the present invention substantially departs from the conventional concepts and designs of the prior art, and in so doing provides an apparatus primarily developed for the purpose of mounting works of art in a spaced apart relationship from a wall.

SUMMARY OF THE INVENTION

In view of the foregoing disadvantages inherent in the known types of mounting brackets now present in the prior art, the present invention provides a new art display bracket construction wherein the same can be utilized for mounting works of art in a spaced apart relationship from a wall.

The general purpose of the present invention, which will be described subsequently in greater detail, is to provide a new art display bracket apparatus and method which has many of the advantages of the mounting brackets mentioned heretofore and many novel features that result in a new art display bracket which is not anticipated, rendered obvious, suggested, or even implied by any of the prior art mounting brackets, either alone or in any combination thereof.

To attain this, the present invention generally comprises an elongate mounting bracket that has opposite first and second ends and a longitudinal axis extending between the first and second ends. The second end of the mounting bracket has a stop portion extending upwardly from it. The mounting bracket has a flange upwardly extending from it that is positioned towards the second end of the mounting bracket. The flange has a threaded aperture extending through it. A threaded fastener is threadably inserted in the threaded aperture of the flange of the mounting bracket and is generally aligned with the longitudinal axis of the mounting bracket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new art display bracket apparatus and method which has many of the advantages of the mounting brackets mentioned heretofore and many novel features that result in a new art display bracket which is not anticipated, rendered obvious, suggested, or even implied by any of the prior art mounting brackets, either alone or in any combination thereof.

It is another object of the present invention to provide a new art display bracket which may be easily and efficiently manufactured and marketed.

It is a further object of the present invention to provide a new art display bracket which is of a durable and reliable construction.

An even further object of the present invention is to provide a new art display bracket which is susceptible of a low cost of manufacture with regard to both materials and labor, and which accordingly is then susceptible of low prices of sale to the consuming public, thereby making such art display bracket economically available to the buying public.

Still yet another object of the present invention is to provide a new art display bracket which provides in the apparatuses and methods of the prior art some of the advantages thereof, while simultaneously overcoming some of the disadvantages normally associated therewith.

Still another object of the present invention is to provide a new art display bracket for mounting works of art in a spaced apart relationship from a wall.

Yet another object of the present invention is to provide a new art display bracket which includes an elongate mounting bracket that has opposite first and second ends and a longitudinal axis extending between the first and second ends. The second end of the mounting bracket has a stop portion extending upwardly from it. The mounting bracket has a flange upwardly extending from it that is positioned towards the second end of the mounting bracket. The flange has a threaded aperture extending through it. A threaded fastener is threadably inserted in the threaded aperture of the flange of the mounting bracket and is generally aligned with the longitudinal axis of the mounting bracket.

Still yet another object of the present invention is to provide a new art display bracket that may include a pane of glass coupled to a front end of the bracket to protect an object such as a sculpture positioned behind the pane.

Even still another object of the present invention is to provide a new art display bracket that improves the aesthetic appeal of a work of art by visually separating it from the background wall.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
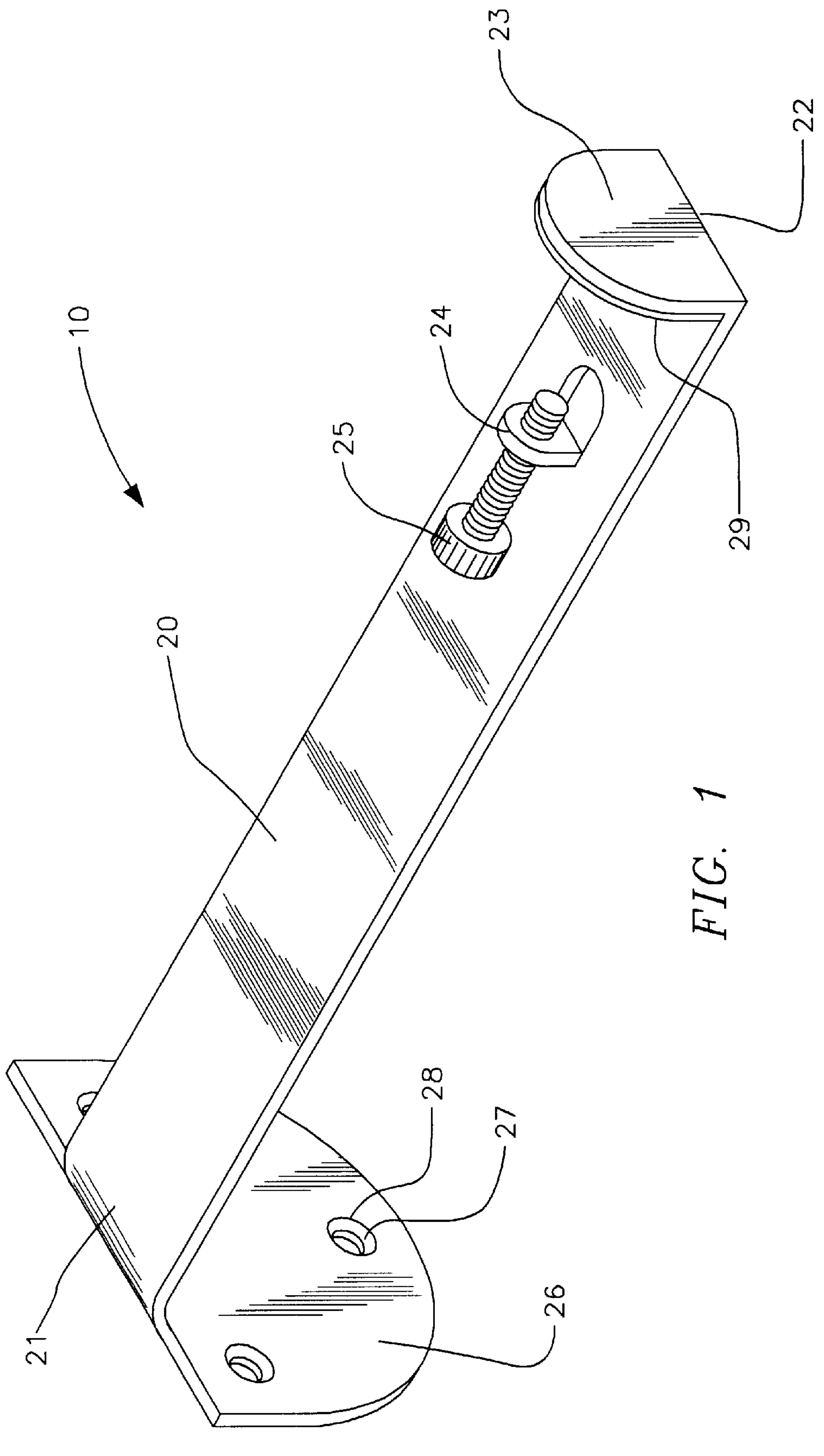
FIG. 1 is a schematic perspective view of a new art display bracket according to the present invention.

With reference now to the drawings, and in particular to FIGS. 1 through 8 thereof, a new art display bracket embodying the principles and concepts of the present invention and generally designated by the reference numeral 10 will be described.

As best illustrated in FIGS. 1 through 8, the art display bracket 10 is a versatile means of creating and enhancing all surface mounted displays. The art display generally comprises an elongate mounting bracket 20 that has opposite first and second ends 21,22 and a longitudinal axis extending between the first and second ends. The second end of the mounting bracket has a stop portion 23 extending upwardly from it at an angle of between about 45 and 150 degrees, ideally about 90 degrees. The mounting bracket has a flange 24 upwardly extending from it that is positioned towards the second end of the mounting bracket. The flange has a threaded aperture extending through it.

A threaded fastener 25 is threadably inserted in the threaded aperture of the flange of the mounting bracket and is generally aligned with the longitudinal axis of the mounting bracket. The threaded fastener is extendible to the stop flange of the mounting bracket to pin objects between the threaded fastener and stop flange. Preferably, the mounting bracket has a generally rectangular transverse cross section taken perpendicular to the longitudinal axis of the mounting bracket.

Also preferably, a wall engaging portion 26 extends downwardly from the first end of the mounting bracket at an angle of between about 45 and 150 degrees, ideally about 90 degrees. A plurality of apertures 27 extend through the wall engaging portion to receive fasteners (not shown) that couple the mounting bracket to the wall. Ideally, each of the apertures has a beveled edge adjacent a front face of the wall engaging portion. Preferred fasteners are flat head screws with tapering heads that conform to the beveled edges of the apertures so that the screws are flush with the front face of the wall engaging portion when screwed into a wall.

Figure 3:
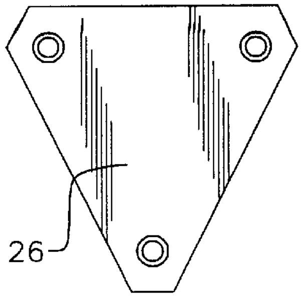
FIG. 3 is a schematic side view of an alternate embodiment of the wall mounting portion of the present invention.
Figure 4:
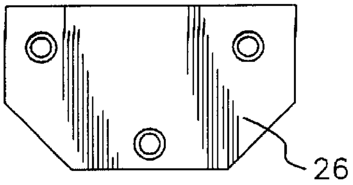
FIG. 4 is a schematic side view of an alternate embodiment of the wall mounting portion of the present invention.
Figure 5:
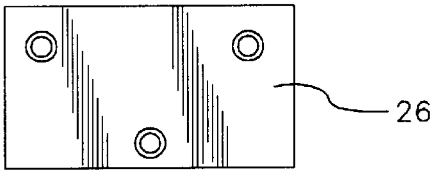
FIG. 5 is a schematic side view of an alternate embodiment of the wall mounting portion of the present invention.

Also ideally, the wall engaging portion is generally D-shaped. Optionally, as shown in FIG. 3, the wall engaging portion may be generally triangular shaped. Also optionally, as shown in FIG. 4, the wall engaging portion is generally D-shaped with straight edges. Also optionally, as shown in FIG. 5, the wall engaging portion is generally rectangular.

Preferably, the stop portion of the second end of the mounting bracket extends in a direction opposite the wall engaging portion. However, the stop portion and wall engaging portion may both extend the same way.

Ideally, the stop portion is generally D-shaped for blocking as little of the view of the front of the object held by the mounting bracket as possible while maximizing the stop portion's ability to hold the object pinned against it by the threaded fastener.

Preferably, the stop portion has a resiliently deformable pad 29 coupled to an inner surface of the stop pad to help prevent damage to the portion of the object pinned against the stop portion. Ideally, the stop portion is about half as high as the wall engaging portion and about as wide as the mounting bracket.

Preferably, the flange of the mounting bracket is generally D-shaped.

The preferred length of the mounting bracket between its ends is between about 2 and 24 inches. The preferred horizontal width of the mounting bracket is between about 1½ and 4 inches.

The preferred horizontal width of the wall engaging portion at its widest portion is between about 2½ and 6 inches. The preferred vertical height of the wall engaging portion between its uppermost and lowermost portions is also between about 2½ and 6 inches.

In use, the wall engaging portion is coupled to a wall surface. An object such as one of the objects described above is placed on the upper surface of the mounting bracket such that it abuts the stop portion of the third mounting bracket. Exemplary uses follow.

Figure 2:
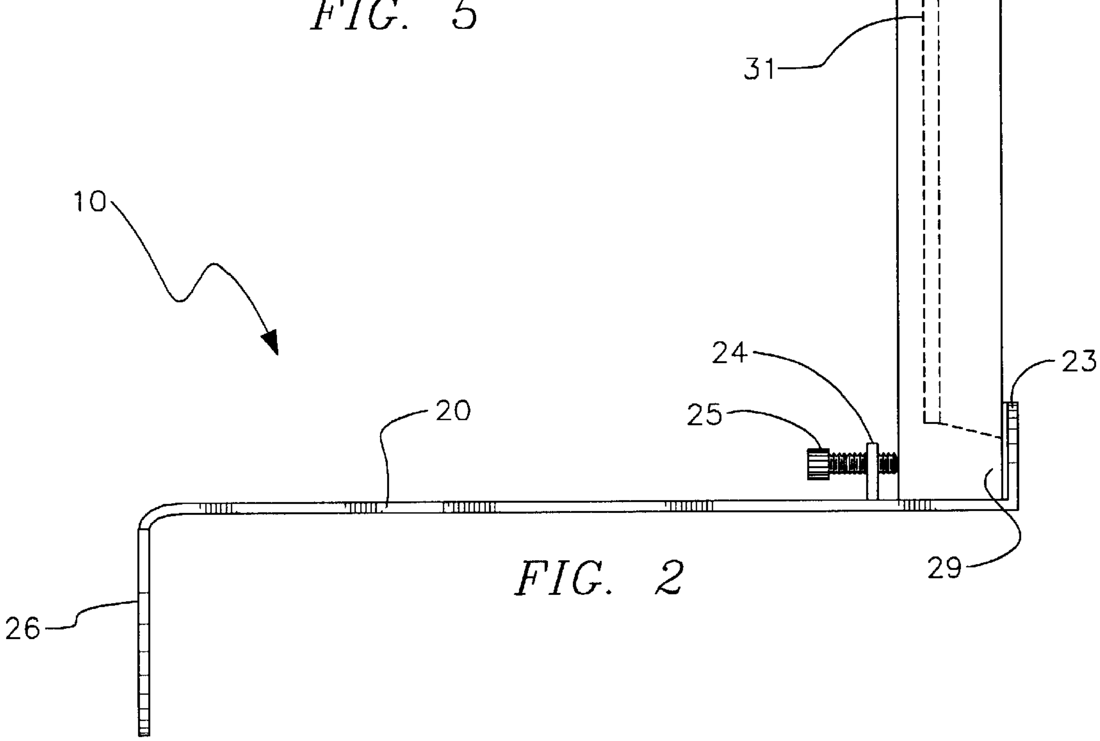
FIG. 2 is a schematic side view of the present invention.

As illustrated in FIG. 2, a frame 30 with a sheet 31 having indicia thereon may rest on an upper surface of the mounting bracket and abut the stop portion of the mounting bracket. The threaded fastener engages a rear face of the frame such that the frame is pinned between the threaded fastener and the stop portion of the mounting bracket.

Figure 6:
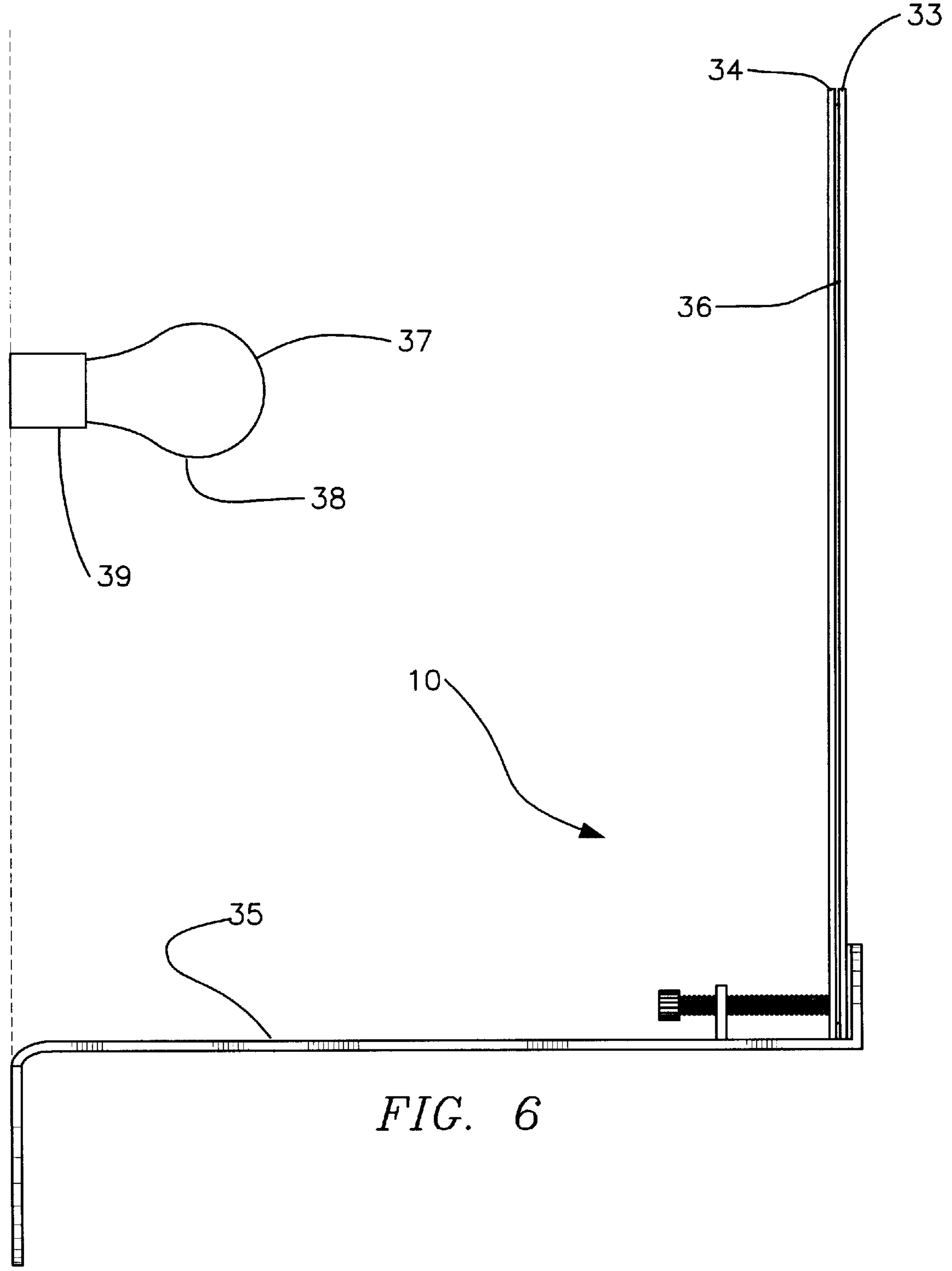
FIG. 6 is a schematic side view of the present invention.

As illustrated in FIG. 6, spaced apart first and second panes 33,34 of glass may rest on an upper surface of a second mounting bracket 35. The second mounting bracket is substantially like the mounting bracket described in the preceding paragraphs, so a recital of its features will not be made here. The first pane abuts the stop portion of the second mounting bracket. A sheet 36 having indicia thereon is disposed between the panes of glass. The threaded fastener engages the second pane such that the panes are pinned between the threaded fastener and the stop portion of the second mounting bracket.

A light source 37 may also be coupled to the wall and positioned behind the second pane of glass. The light source is for providing backlighting. Preferably, the light source comprises a light bulb 38 and a socket 39.

Figure 8:
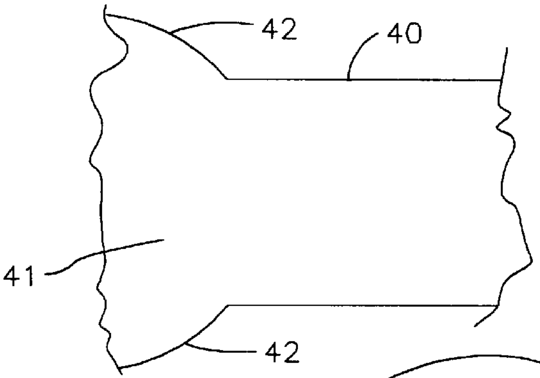
FIG. 8 is a schematic partial side view taken from line 8—8 of FIG. 7.
Figure 7:
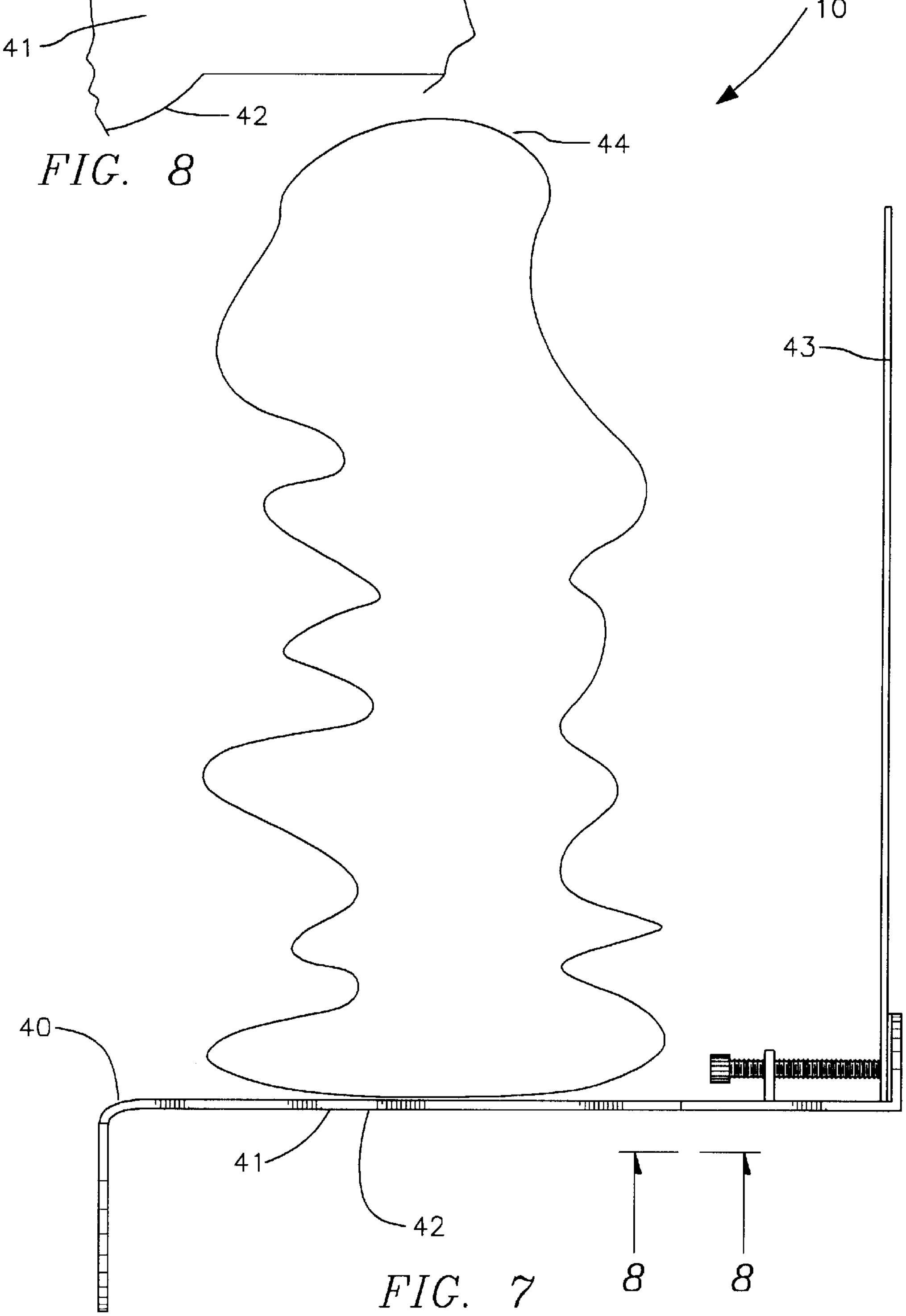
FIG. 7 is a schematic side view of another alternate embodiment of the present invention.

As illustrated in FIGS. 7 and 8, a third mounting bracket 40 may have a winged portion 41 that is positioned between its first end and its flange. The winged portion has a pair of arcuate wings 42 extending outwardly from it. A third pane 43 of glass may rest on an upper surface of a third mounting bracket and abut the stop portion of the third mounting bracket. A three dimensional object 44 such as a sculpture could rest on a winged portion of the third mounting bracket and be positioned behind the third pane of glass. The threaded fastener would engage the third pane such that the third pane is pinned between the threaded fastener and the stop portion of the third mounting bracket.

Also, a plurality of mounting brackets could be arranged in a rectangular configuration on a wall, vertically aligned sets of the mounting brackets facing each other. A rug and a large pane of glass could extend between the mounting brackets such that the rug extends across the rectangle formed by the mounting brackets, with the pane extending across the front of the rug and mounted to the mounting brackets.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A display bracket assembly for supporting objects in a spaced apart relation from a wall, said mounting bracket assembly comprising:

an elongate mounting bracket having opposite first and second ends and a longitudinal axis extending between said first and second ends;

said second end of said mounting bracket having a stop portion extending upwardly therefrom;

said mounting bracket having a flange upwardly extending therefrom, said flange being positioned in spaced relationship to said second end of said mounting bracket, said flange having a threaded aperture extending therethrough;

a threaded fastener being threadably inserted in said threaded aperture of said flange of said mounting bracket such that an end of said threaded fastener is movable towards said second end of said mounting bracket;

a pane coupled between said stop portion and said end of said threaded fastener such that said pane is supported on said mounting bracket; and wherein said mounting bracket includes a winged portion being positioned between said first end thereof and said flange thereof such that said winged portion is adapted for supporting an object between the wall to which the mounting bracket is coupled and said pane.

2. The display bracket assembly of claim 1, wherein said mounting bracket has a generally rectangular transverse cross section taken perpendicular to said longitudinal axis of said mounting bracket.

3. The display bracket assembly of claim 2, wherein said first end of said mounting bracket has a wall engaging portion extending downwardly therefrom, said wall engaging portion being adapted for mounting to the wall.

4. The display bracket assembly of claim 3, wherein said wall engaging portion is generally D-shaped.

5. The display bracket assembly of claim 3, wherein said wall engaging portion is generally triangular shaped.

6. The display bracket assembly of claim 3, wherein said wall engaging portion is generally D-shaped with straight edges.

7. The display bracket assembly of claim 3, wherein said wall engaging portion is generally rectangular.

8. The display bracket assembly of claim 1, wherein said stop portion is generally D-shaped.

9. The display bracket assembly of claim 1, wherein said stop portion has a resiliently deformable pad coupled to an inner surface of said stop portion.

10. The display bracket assembly of claim 1 wherein said flange has a smaller cross-sectional area than said stop portion for minimizing visibility of said flange through said pane.

11. A display bracket assembly for supporting objects in a spaced apart relation from a wall, said mounting bracket assembly comprising:

an elongate mounting bracket having opposite first and second ends and a longitudinal axis extending between said first and second ends;

said second end of said mounting bracket having a stop portion extending upwardly therefrom;

said mounting bracket having a flange upwardly extending therefrom, said flange being positioned in spaced relationship to said second end of said mounting bracket, said flange having a threaded aperture extending therethrough;

a threaded fastener being threadably inserted in said threaded aperture of said flange of said mounting bracket such that an end of said threaded fastener is movable towards said second end of said mounting bracket;

a pair of panes coupled between said stop portion and said end of said threaded fastener such that said pair of panes are supported on said mounting bracket; and a sheet positioned between said pair of panes.

12. The display bracket assembly of claim 11, further comprising:

a light source adapted to be coupled to the wall adjacent to said mounting bracket for providing backlight to said sheet.

* * * * *